(12) United States Patent
Oosuga et al.

(10) Patent No.: US 6,310,448 B1
(45) Date of Patent: Oct. 30, 2001

(54) CRT DISPLAY DEVICE HAVING DISCHARGE CURRENT LIMITING RESISTORS IN HIGH-VOLTAGE SUPPLY LINES

(75) Inventors: Satoshi Oosuga, Saitama; Hiroaki Kikuchi; Yuusuke Kawamura, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/257,393

(22) Filed: Feb. 25, 1999

(30) Foreign Application Priority Data

Mar. 6, 1998 (JP) .............................................. P10-054742

(51) Int. Cl.⁷ ...................................................... H01J 29/70
(52) U.S. Cl. ......................................... 315/411; 315/382.1
(58) Field of Search ................................... 315/411, 381, 315/382.1, 9, 368.25, 276, 283; 348/377, 379, 380

(56) References Cited

U.S. PATENT DOCUMENTS

| | | | | |
|---|---|---|---|---|
| 3,855,614 | * | 12/1974 | Okada ...................................... | 358/74 |
| 3,898,381 | * | 8/1975 | Amsen et al. ........................... | 358/74 |
| 4,045,742 | * | 8/1977 | Meehan et al. .......................... | 328/9 |
| 4,404,500 | * | 9/1983 | Stow ....................................... | 315/381 |
| 4,599,642 | * | 7/1986 | Willis ...................................... | 358/65 |
| 4,679,092 | * | 7/1987 | Blanken et al. ....................... | 358/242 |
| 4,703,345 | * | 10/1987 | Matsuzaki et al. .................... | 358/74 |
| 5,589,883 | * | 12/1996 | Ogino et al. ........................... | 315/381 |

\* cited by examiner

*Primary Examiner*—Don Wong
*Assistant Examiner*—Thuy Vinh Tran
(74) *Attorney, Agent, or Firm*—Oblon, Spivak, McClelland, Maier & Neustadt, P.C.

(57) ABSTRACT

Discharge current limiting resistors are provided in respective high-voltage supply lines for distributing high voltages produced by a high-voltage distributor to the anodes of respective CRTs. As a result, a discharge current coming from a high-voltage capacitor that is part of a total discharge current flowing into a CRT where an abnormal discharge has occurred can be reduced to ½ of that in the conventional case and discharge currents coming from coating capacitances of the remaining CRTs that is another part of the total discharge current can be inhibited.

16 Claims, 7 Drawing Sheets

CRT DISPLAY DEVICE HAVING DISCHARGE CURRENT LIMITING RESISTORS IN HIGH-VOLTAGE SUPPLY LINES

BACKGROUND OF THE INVENTION

1. Field of the Invention

The present invention relates to a CRT display device to be used in a projector apparatus etc. and is particularly suitable in reducing discharge current that flows through a CRT (cathode-ray tube) when an abnormal discharge has occurred there.

2. Description of the Related Art

In various television receivers and monitor apparatuses of the CRT type, because of the structure of the electron gun used in the CRT, an abnormal discharge may occur between the anode and the cathode (electron gun) owing to foreign matter such as dust that exists inside the CRT.

Conventionally, to prevent an abnormal discharge in the CRT, various improvements and developments have been made in the electrode shapes of the electron gun, the method for polishing the electrode surfaces, the shape of the electrode supporting glass rods, the knocking characteristic, the inside coating (employment of a coating having high peel strength), etc.

In addition to the above improvements and developments, various studies and developments have been made of the method for reducing the discharge current of an abnormal discharge to prevent the CRT itself or peripheral circuits from being damaged even if an abnormal discharge occurs inside the CRT.

An example method for reducing the discharge current when an abnormal discharge occurs inside the CRT is employment of a PCE (peak current equalizer) in which a stainless lead wire for supplying a prescribed voltage to an electrode of the electron gun is replaced by a ceramic resistor of several kilo-ohms so that the cathode-side discharge path has a relatively high impedance.

However, even if the cathode side of the CRT is given a relatively high impedance, there still remains a possibility that the cathode or the heater of the electron gun that is provided on the cathode side or a circuit part connected thereto is damaged when a relatively large discharge current flows into the cathode side.

There are other possibilities that an abnormal sound is generated inside the CRT and that the peripheral circuits operate erroneously to impair its own functions of the television receiver or the monitor apparatus.

In particular, a projector apparatus or the like in which CRTs of red (R), green (G), and blue (B) are used, when an abnormal discharge has occurred in one of the R, G, and B-CRTs, say, the R-CRT, a discharge current coming from a high-voltage capacitor that is provided in a high-voltage block for supplying an anode voltage and discharge currents caused by the coating capacitances of the other CRTs where no abnormal discharge has occurred flow into the R-CRT in an additive manner. As a result, a relatively large discharge current flows into the cathode side (electron gun) of the R-CRT where the discharge has occurred, which causes a trouble in the cathode or the heater of the electron gun or a circuit part connected thereto, for example, it is damaged.

SUMMARY OF THE INVENTION

An object of the present invention is to provide a CRT display device which is free of any trouble even if an abnormal discharge occurs in a CRT.

The invention provides a CRT display device comprising high-voltage generating means for generating high-voltage pulses; high-voltage distributing means for converting the high-voltage pulses to a high voltage having a prescribed voltage value and distributing the high voltage; a CRT supplied with the high voltage at an anode thereof; and a discharge current limiting resistor provided in a high-voltage supply line for supplying the high voltage from the high-voltage distributing means to the anode of the CRT.

The discharge current limiting resistor may have a sufficiently larger resistance value than an inside carbon coating that is formed in the CRT.

The high-voltage distributing means may be one that distributes the high voltage to three CRTs that generate three primary color pictures, respectively.

According to the invention, by providing the discharge current limiting resistors having, for example, a sufficiently larger resistance than the inside carbon coatings in the high-voltage supply lines for distributing a high voltage produced by the high-voltage distributing means to the anodes of the respective CRTs, a discharge current coming from the high-voltage capacitor to a CRT where an abnormal discharge has occurred can be reduced and discharge currents coming from the coating capacitances of the remaining CRTs can be inhibited.

The invention is particularly effective when applied to a projector apparatus using three CRTs, because discharge currents flowing from the coating capacitances of CRTS where no abnormal discharge has occurred to a CRT where an abnormal discharge has occurred can be prevented almost completely.

DETAILED DESCRIPTION OF THE PREFERRED EMBODIMENTS

CRT display devices according to embodiments of the present invention will be hereinafter described.

Figure 2:
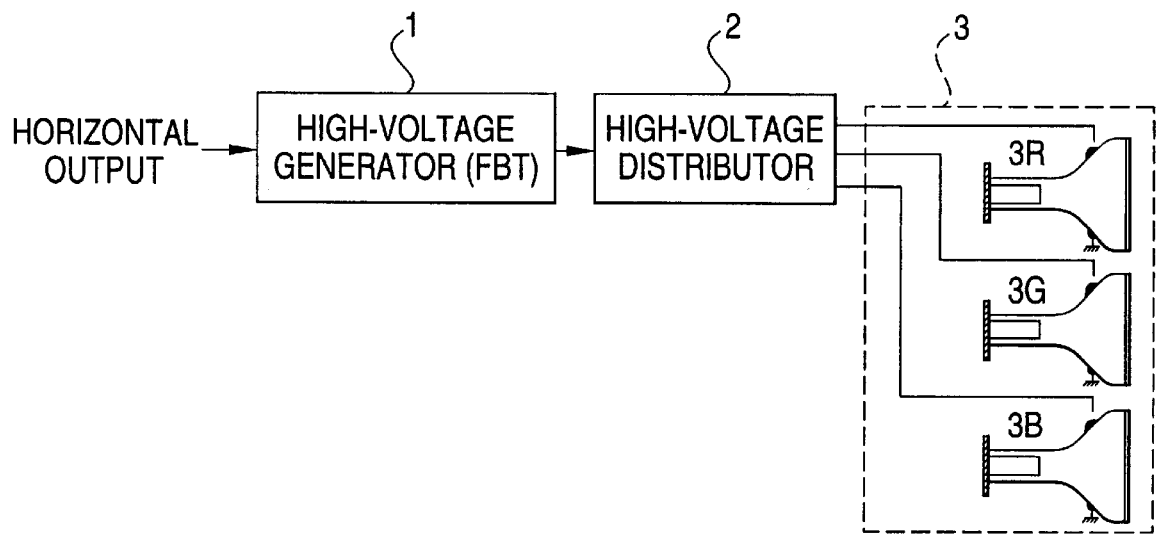
FIG. 2 shows an example of CRTs and high-voltage blocks of a CRT display device according to a first embodiment of the present invention.

FIG. 2 shows an example of CRTs and high-voltage blocks according to a first embodiment of the invention that is to be used in a three-tube projector apparatus or the like.

In FIG. 2, a high-voltage generator 1, which is constituted of a flyback transformer (FBT), for example, generates high-voltage pulses based on flyback pulses that are supplied from the upstream block (not shown). A high-voltage distributor 2 supplies CRTs 3R, 3G, and 3B of the respective colors with a prescribed anode voltage that is produced by smoothing the high-voltage pulses supplied from the high-voltage generator 1.

Further, in this embodiment, a discharge current limiting resistor that is the feature of the invention is provided in each of the high-voltage supply lines for supplying the anode voltage (high voltage) from the high voltage distributor 2 to the CRTs 3R, 3G, and 3B. The details of the discharge current limiting resistor will be described later.

As for the CRTs 3, the phosphor coating formed on the inside surface of each of the CRTs 3R, 3G, and 3B emits light when excited by an electron beam emitted from the electron gun that is controlled by a video signal, whereby a color picture is displayed on the screen.

Figure 3:
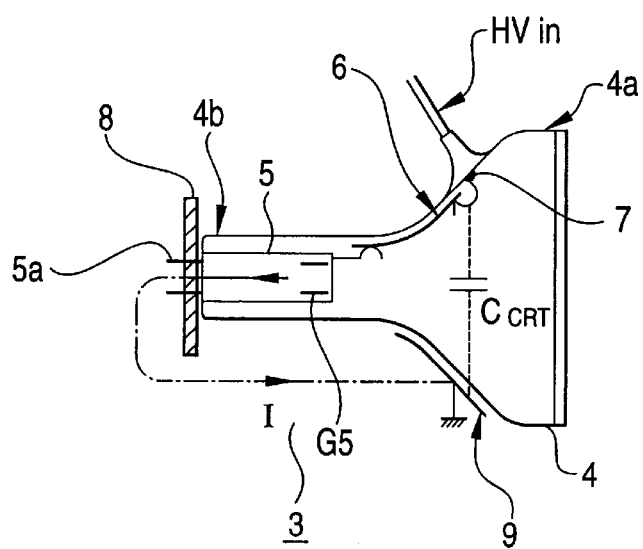
FIG. 3 shows the structure of each CRT.

FIG. 3 shows the structure of each CRT 3. As shown in FIG. 3, an electron gun 5, a phosphor screen (not shown), etc. are sealed in a glass bulb 4 that is shaped like a funnel, for example. The glass bulb 4, which consists of a bulgy cone portion 4a and a narrow cylindrical neck portion 4b, is formed by coating the bottom surface of the cone portion 4a with a phosphor and then evacuating the glass bulb 4 to provide a high vacuum inside.

The electron gun 5 that is provided in the neck portion 4b has a cathode for emitting electrons and a plurality of electrodes for controlling acceleration and focusing of electrons that are emitted from the cathode.

Among the plurality of electrodes formed in the electron gun 5, a fifth grid (electrode) G5 as the final electrode, for example, is connected to one end of an inside carbon coating 6 that is formed on the inside surface of the glass bulb 4. The other end of the inside carbon coating 6 is connected to an anode button 7 that is to be supplied with an anode voltage HV.

Base pins 5a of the electron gun 5 are led out from the glass bulb 4 and connected to a circuit board 8 on which various circuits for, for example, controlling the electron gun 5 are formed.

An outside carbon coating 9 that is connected to the ground is formed on the outside surface of the glass bulb 4. A coating capacitance $C_{CRT}$ exists between the inside carbon coating 6 and the outside carbon coating 9.

When an abnormal discharge occurs in the CRT 3 having the above structure, a discharge current I flows through a path (fifth grid G5→electron gun 5→outside carbon coating 9) indicated by a broken line and a chain line, for example. Therefore, the magnitude of the discharge current I is determined by the resistance value of the inside carbon coating 6 between the anode button 7 and the fifth grid G5.

The discharge current I is given by $$I = \frac{HV}{r} \quad (1)$$

where r is the resistance value of the inside carbon coating 6 and HV is the anode voltage.

Therefore, the discharge current I can be made smaller by increasing the resistance value r of the inside carbon coating 6. However, actually, the resistance value r of the inside carbon coating 6 has an upper limit of several hundred ohms; the discharge current I cannot be reduced by increasing the resistance value r of the inside carbon coating 6 beyond that limit.

In view of the above, in the invention, a discharge current limiting resistor for reducing a discharge current at the occurrence of an abnormal discharge is provided in each high-voltage supply line of the high-voltage distributor 2.

Figure 4:
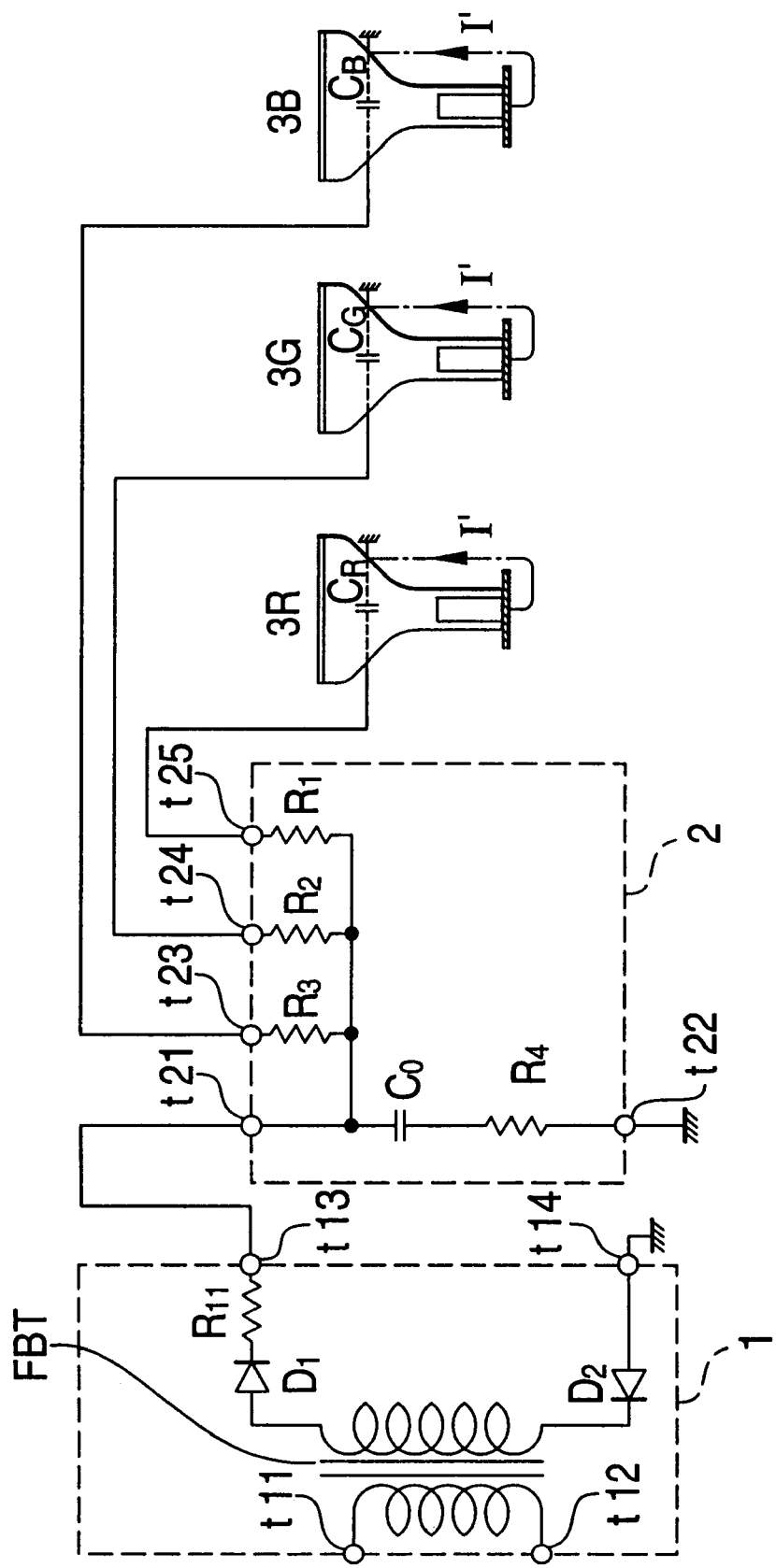
FIG. 4 shows a specific configuration of CRTs and high-voltage circuit blocks according to the first embodiment.

FIG. 4 shows a specific configuration of CRTs and high-voltage blocks of the CRT display device according to the first embodiment shown in FIG. 2.

As shown in FIG. 4, in the high-voltage generator 1, flyback pulses are supplied to the primary high-voltage winding of a flyback transformer FBT via terminals t11 and t12 and high-voltage pulses are generated between terminals t13 and t14 that are connected to the secondary winding via diodes D1 and D2 and a resistor R11.

The high-voltage pulses are supplied to a high-voltage capacitor $C_0$ of the high-voltage distributor 2 via a terminal t21 and then smoothed out by the high-voltage capacitor $C_0$ into a prescribed anode voltage HV, which is supplied, via discharge current limiting resistors R1, R2, and R3 of the invention, to the anodes of the respective CRTs 3R, 3G, and 3B that are connected to respective terminals t25, t24, and t23. A current limiting resistor R4 is connected in series to the high-voltage capacitor $C_0$.

Next, a description will be made of a discharge current that flows when an abnormal discharge occurs in the CRT display device of the embodiment. Before doing so, a discharge current that flows when an abnormal discharge occurs in a conventional CRT display device will be described with reference to FIG. 1.

Figure 1:
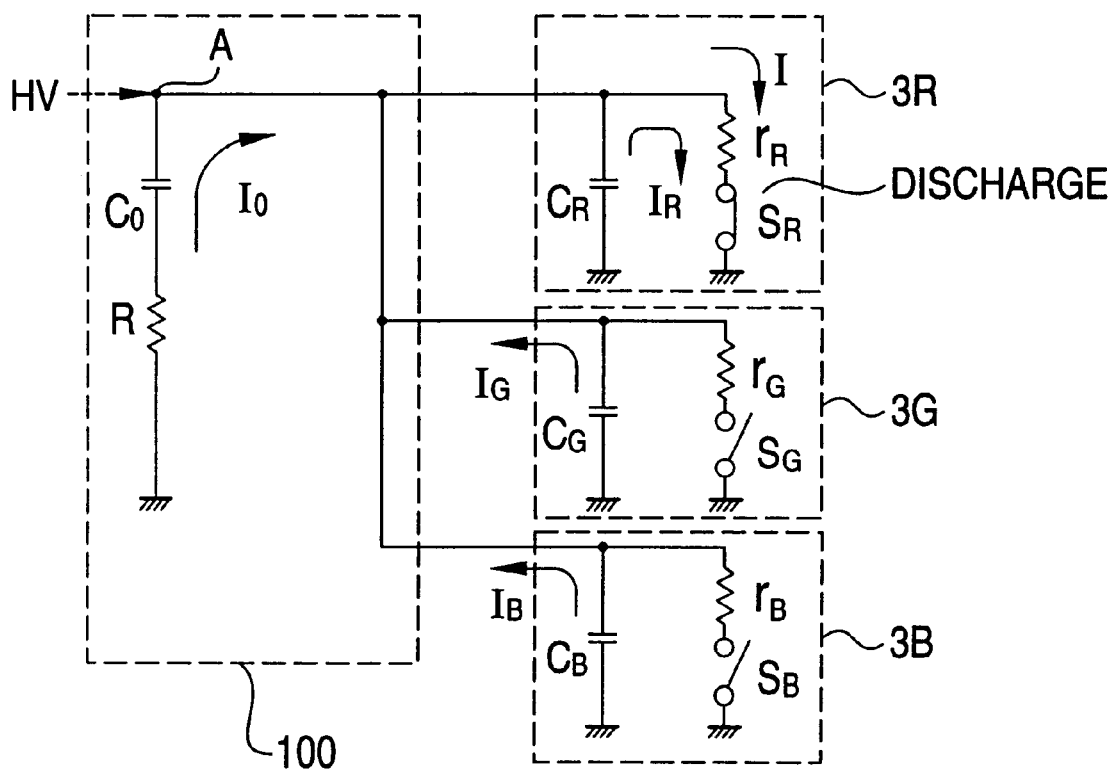
FIG. 1 illustrates a discharge current that occurs in a conventional CRT display device.

FIG. 1 illustrates a discharge current that occurs in a conventional CRT display device.

As shown in FIG. 1, a high-voltage capacitor $C_0$ and a current limiting resistor R are connected in series to each other in a high-voltage distributor 100.

As for CRTs 3R, 3G, and 3B, $C_R$, $C_G$, and $C_B$ represent coating capacitances each formed by the inside carbon coating 6 and the outside carbon coating 9 and $r_R$, $r_G$, and $r_B$ represent resistance values of the respective inside carbon coatings 6.

For the sake of convenience, switches $S_R$, $S_G$, and $S_B$ indicate occurrence/non-occurrence of an abnormal discharge in the respective CRTs 3R, 3G, and 3B. That is, in the example of FIG. 1, a discharge has occurred in the CRT 3R in which the switch $S_R$ is turned on.

As shown in FIG. 1, a discharge current I flowing through the CRT 3R when an abnormal discharge has occurred in the CRT 3R is the sum of a discharge current $I_0$, coming from the high-voltage capacitor $C_0$, a discharge current $I_R$ coming from the coating capacitance $C_R$ of the CRT 3R, and discharge currents $I_G$ and $I_B$ coming from the coating capacitances $C_G$ and $C_B$ of the respective CRTs 3G and 3B via the high-voltage distributor 2.

That is, the discharge current I is given by $$I = I_0 + I_R + I_G + I_B \quad (2).$$

If it is assumed that the coating capacitances $C_R$, $C_G$, and $C_B$ of the CRTs 3R, 3G, and 3B are the same, the discharge currents $I_R$, $I_G$, and $I_B$ coming from the coating capacitances $C_R$, $C_G$, and $C_B$ are the same, too. Therefore, the discharge current I flowing through the CRT 3R is expressed as $$I = I_0 + 3I_R \quad (3).$$

Next, a discharge current that occurs in the CRT display device of the embodiment will be described with reference to FIG. 5. The parts in FIG. 5 that are the same as in FIG. 1 are given the same reference symbols as in FIG. 1 and will not described below.

Figure 5:
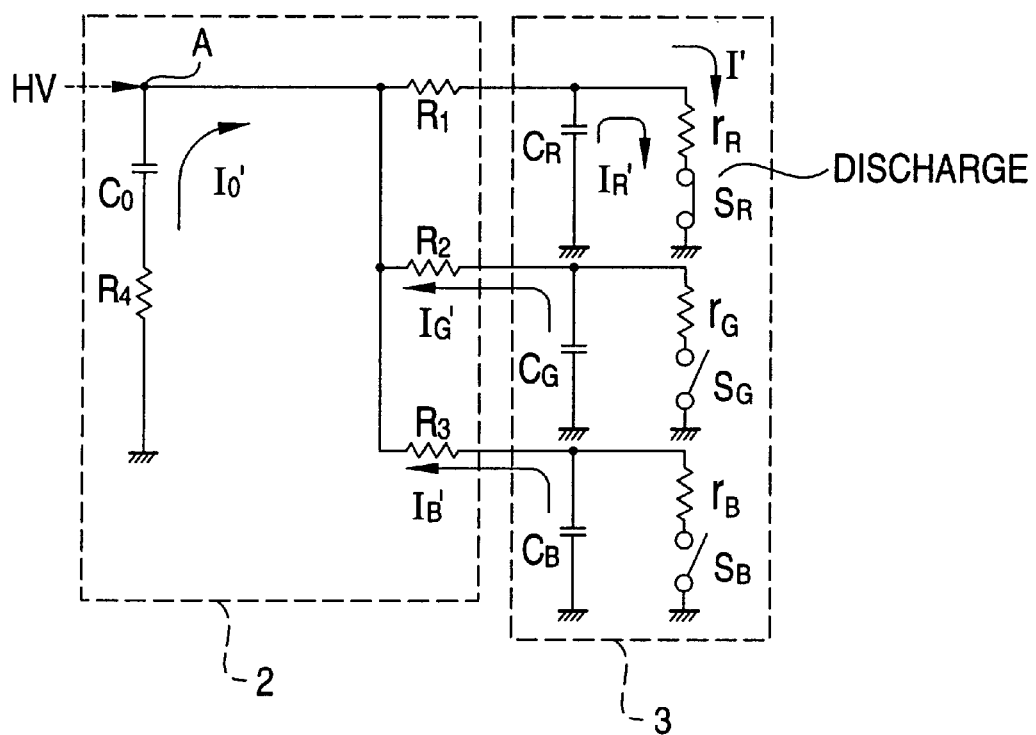
FIG. 5 illustrates a discharge current flowing through a CRT of the CRT display device according to the first embodiment.

As shown in FIG. 5, in the high-voltage distributor 2 of the CRT display device of the embodiment, the discharge current limiting resistors R1, R2, and R3 that are the feature of the invention are provided in the respective supply lines for supplying the anode voltage to the respective CRTs 3R, 3G, and 3B.

Also in this case, a discharge current I' flowing through the CRT 3R when an abnormal discharge has occurred in the CRT 3R is the sum of a discharge current $I_0'$ coming from the high-voltage capacitor $C_0$, a discharge current $I_R'$ coming from the coating capacitance $C_R$ of the CRT 3R, and discharge currents $I_G'$ and $I_B'$ coming from the coating capacitances $C_G$ and $C_B$ of the respective CRTs 3G and 3B via the high-voltage distributor 2.

That is, the discharge current I' is given by $$I=I_0'+I_R'+I_G'+I_B' \tag{4}$$

With a notation (see FIG. 1) that the potential at point A in the high-voltage distributor 100 is represented by HV, the resistance value of the current limiting resistor R is also represented by R, and the resistance value of the inside carbon coating 6 is represented by r, the discharge current $I_0$ coming from the high-voltage capacitor $C_0$ is given by $$I_0 = \frac{HV}{(R+r)}. \tag{5}$$

Further, with a notation (see FIG. 5) that the potential at point A in the high-voltage distributor 2 is represented by HV, all the resistance values of the discharge current limiting resistors R1, R2, and R3 and the current limiting resistor R4 are represented by R (they have the same value), and the resistance value of the inside carbon coating 6 is represented by r, the discharge current $I_0'$ coming from the high-voltage capacitor $C_0$ is given by $$I_0' = \frac{HV}{(2R+r)}. \tag{6}$$

Therefore, from Equations (5) and (6), the discharge current $I_0'$ can be expressed as $$I_0' = \frac{(R+r)}{(2R+r)} I_0. \tag{7}$$

Through similar consideration, the discharge currents $I_G'$ and $I_B'$ coming from the coating capacitances $C_G$, and $C_B$ of the respective CRTs 3G and 3B are calculated as $$I_G' = \frac{r}{(R+r)} I_G, \tag{8}$$

$$I_B' = I_G'. \tag{9}$$

As for the discharge current $I_R'$ coming from the coating capacitance $C_R$ of the CRT 3R, Equation (10) holds.

Therefore, from Equations (4) and (7)–(10), the discharge current I' flowing through the CRT 3R when an abnormal discharge $$I_R'=I_R \tag{10}$$

has occurred in the CRT 3R of the CRT display device of the $$I' = \frac{(R+r)}{(2R+r)} I_0 + I_R + \frac{r}{(R+r)} I_G + \frac{r}{(R+r)} I_B. \tag{11}$$

embodiment can be expressed as

If R>>r, the discharge current I' is given by

That is, in the CRT display device of the embodiment, by $$I' = \frac{1}{2} I_0 + I_R. \tag{12}$$

providing the discharge current limiting resistors R1, R2, and R3 having the resistance value R that is sufficiently larger than the resistance value r of the inside carbon coating 6 in the respective supply lines for supplying the anode current from the high-voltage distributor 2 to the respective CRTs 3R, 3G, and 3B, the discharge current $I_0'$ coming from the high-voltage capacitor $C_0$ when an abnormal discharge has occurred in the CRT 3R, for example, can be made ½ of the discharge current $I_0$, in the conventional case.

The sum of the discharge currents coming from the coating capacitances of the respective CRTs can be reduced to ⅓ of that in the conventional case, because the discharge currents $I_G'$ and $I_B'$ coming from the respective coating capacitances $C_G$ and $C_B$ via the high-voltage distributor 2 are inhibited and only the discharge current $I_R'$ coming from the coating capacitance $C_R$ remains.

Figure 6:
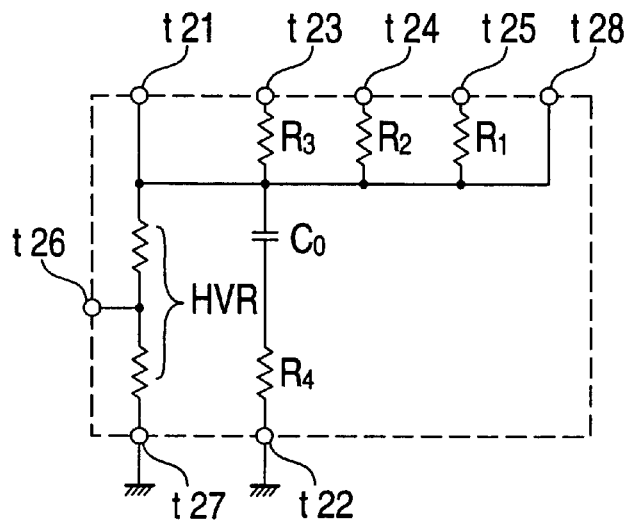
FIG. 6 shows a specific circuit configuration of a high-voltage distributor of the CRT display device according to the first embodiment.

FIG. 6 shows a specific circuit configuration of the high-voltage distributor 2 of the CRT display device of the embodiment.

A terminal t21 shown in FIG. 6 is supplied with high-voltage pulses by the high-voltage generator 1. The high-voltage pulses are smoothed out by the high-voltage capacitor $C_0$, and a resulting anode voltage is supplied to the anodes of the respective CRTs 3R, 3G, and 3B via the discharge current limiting resistors R1, R2, and R3 that are the feature of the invention and terminals t25, t24, and t23.

A terminal t28 is a check terminal to be used for checking the high voltage value. A terminal t26 is a detection terminal to be used for detecting the high voltage value in the form of a divided voltage obtained by dividing the high voltage HV by resistors HVR. Terminals t27 and t22 are ground terminals.

The CRT display device of the embodiment can easily be constructed by providing the discharge current limiting resistors R1, R2, and R3 in the voltage distributor 2 in the above manner. Further, by giving the discharge current limiting resistors R1, R2, and R3 the same resistance value R as described above, a variation in deflection sensitivity among the CRTs 3R, 3G, and 3B can be inhibited (the deflection sensitivity of each CRT 3 is in proportion to the square of the high voltage value).

Making all of the current limiting resistor R4 and the discharge current limiting resistors R1, R2, and R3 have the same resistance value R provides an advantage that the ease of operation in an assembling process can be improved because of no need for sort out resistors according to their resistance values.

Giving the same potentials to the check terminal t28 and the detection terminal t26 and disposing those terminals at both ends can prevent erroneous insertion of a high-voltage lead.

Next, a CRT display device according to a second embodiment of the invention will be described.

Figure 7:
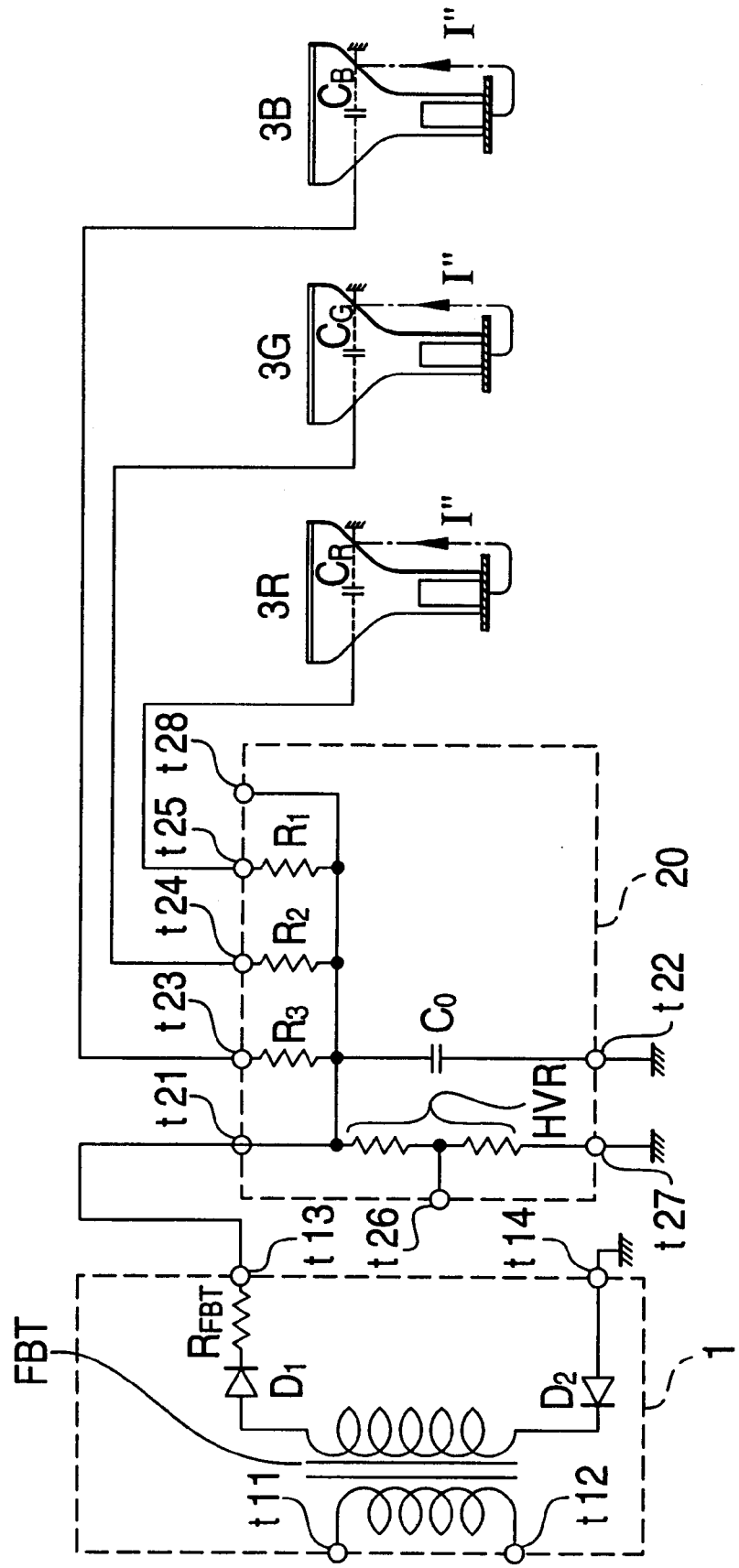
FIG. 7 shows a specific configuration of CRTs and high-voltage circuit blocks according to a second embodiment of the invention.

FIG. 7 shows a specific configuration of CRTs and high-voltage circuit blocks of a CRT display device according to the second embodiment of the invention. The parts in FIG. 7 that are the same as in FIG. 4 are given the same reference symbols as in FIG. 4 and will not described below.

Also in this embodiment, in a high-voltage generator 1, flyback pulses are supplied to the primary high-voltage winding of a flyback transformer FBT via terminals t11 and t12 and high-voltage pulses are generated between terminals t13 and t14 that are connected to the secondary winding via diodes D1 and D2 and a resistor R11.

The high-voltage pulses are supplied to a high-voltage capacitor $C_0$ of a high-voltage distributor 20 via a terminal t21 and then smoothed out by the high-voltage capacitor $C_0$ into a prescribed anode voltage HV, which is supplied, via discharge current limiting resistors R1, R2, and R3 of the invention, to the anodes of respective CRTs 3R, 3G, and 3B. In this embodiment, unlike the case of FIG. 4, no current limiting resistor R4 is provided.

Figure 8:
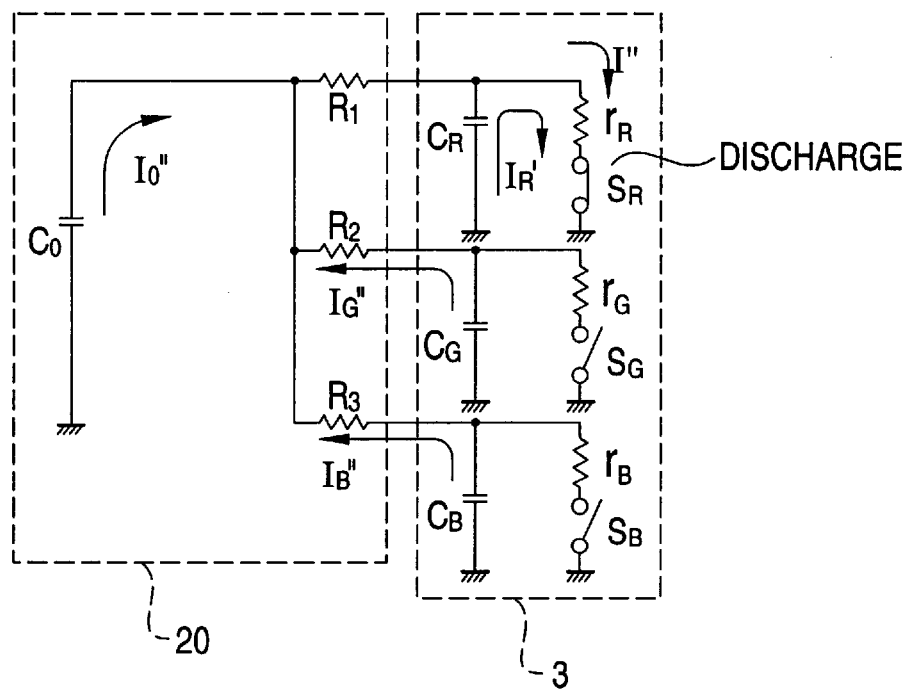
FIG. 8 illustrates a discharge current flowing through a CRT of the CRT display device according to the second embodiment.

FIG. 8 illustrates a discharge current that occurs in the CRT display device of the second embodiment. The parts in FIG. 8 that are the same as in FIG. 5 are given the same reference symbols as in FIG. 5 and will not described below.

Also in this embodiment, a discharge current I'' flowing through the CRT 3R when an abnormal discharge has occurred in the CRT 3R is the sum of a discharge current $I_0$'' coming from the high-voltage capacitor $C_0$, a discharge current $I_R$'' coming from the coating capacitance $C_R$ of the CRT 3R, and discharge currents $I_G$'' and $I_B$'' coming from the coating capacitances $C_G$ and $C_B$ of respective CRTs 3G and 3B via the high-voltage distributor 20.

However, since no current limiting resistor R4 is provided, the discharge current $I_0$'' coming from the high-voltage capacitor $C_0$ is equal to the discharge current $I_0$ in the conventional case. Only the discharge currents $I_G$'' and $I_B$'' coming from the coating capacitances $C_G$ and $C_B$ are inhibited.

Therefore, the discharge current I'' flowing through the CRT 3R is given by $$I''=I_0+I_R \quad (13).$$

That is, in the CRT display apparatus of this embodiment shown in FIG. 8, the discharge current I'' flowing through the CRT 3R when an abnormal discharge occurs there is such that the sum of the discharge currents coming from the coating capacitances of the respective CRTs is made ⅓ of that in the conventional case.

In this embodiment, the current limiting resistor R4 is omitted by using the discharge current limiting resistors R1, R2, and R3 also as the current limiting resistor R4. As a result, the number of high-voltage-pulse-resistant resistors that are generally expensive and occupy considerable spaces can be reduced, which realizes space saving, cost reduction, and improvement in reliability.

Further, since the high-voltage capacitor $C_0$ is directly grounded, its integration effect is enhanced, which provides advantages such as improvement in a phenomenon that when a picture including a high-brightness horizontal line is displayed on the CRT screen, vertical lines under the horizontal line are waved (what is called post-bar oscillation).

If it is necessary to decrease the discharge current $I_0$'' coming from the high-voltage capacitor $C_0$ to ½ of the discharge current $I_0$ in the conventional case as in the case of FIG. 5, the resistance values of the discharge current limiting resistors R1, R2, and R3 may be doubled.

Incidentally, in the second embodiment of FIG. 8, although the discharge current limiting resistors R1, R2, and R3 serve as resistors for limiting currents coming from the high-voltage capacitor $C_0$ during discharging of the high-voltage capacitor $C_0$, it appears that the high-voltage distributor 20 has no current limiting resistors during charging of the high-voltage capacitor $C_0$.

Figure 9:
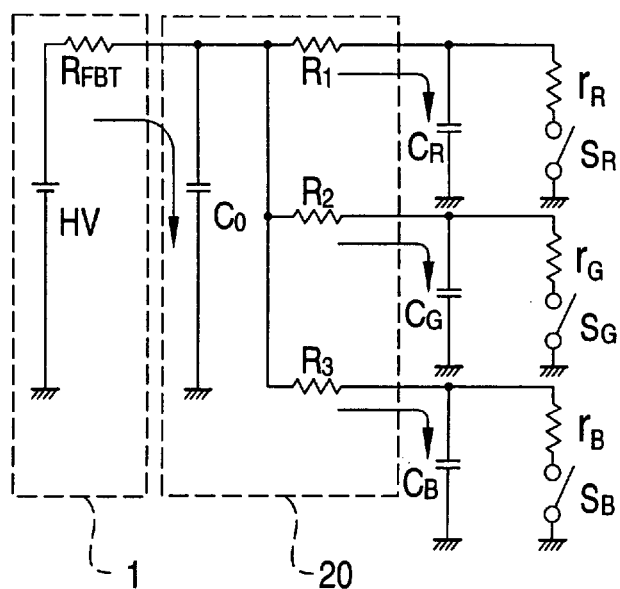
FIG. 9 illustrates a charging operation of the CRT display device according to the second embodiment.

However, during discharging, since energy is supplied from the flyback transformer FBT of the high-voltage generator 1 as shown in FIG. 9, a resistance component $R_{FBT}$ of the flyback transformer FBT acts as a current limiting resistor, whereby currents flowing through the high-voltage capacitor $C_0$ during its charging and discharging can be made approximately the same as in the case of FIG. 5.

Figure 10:
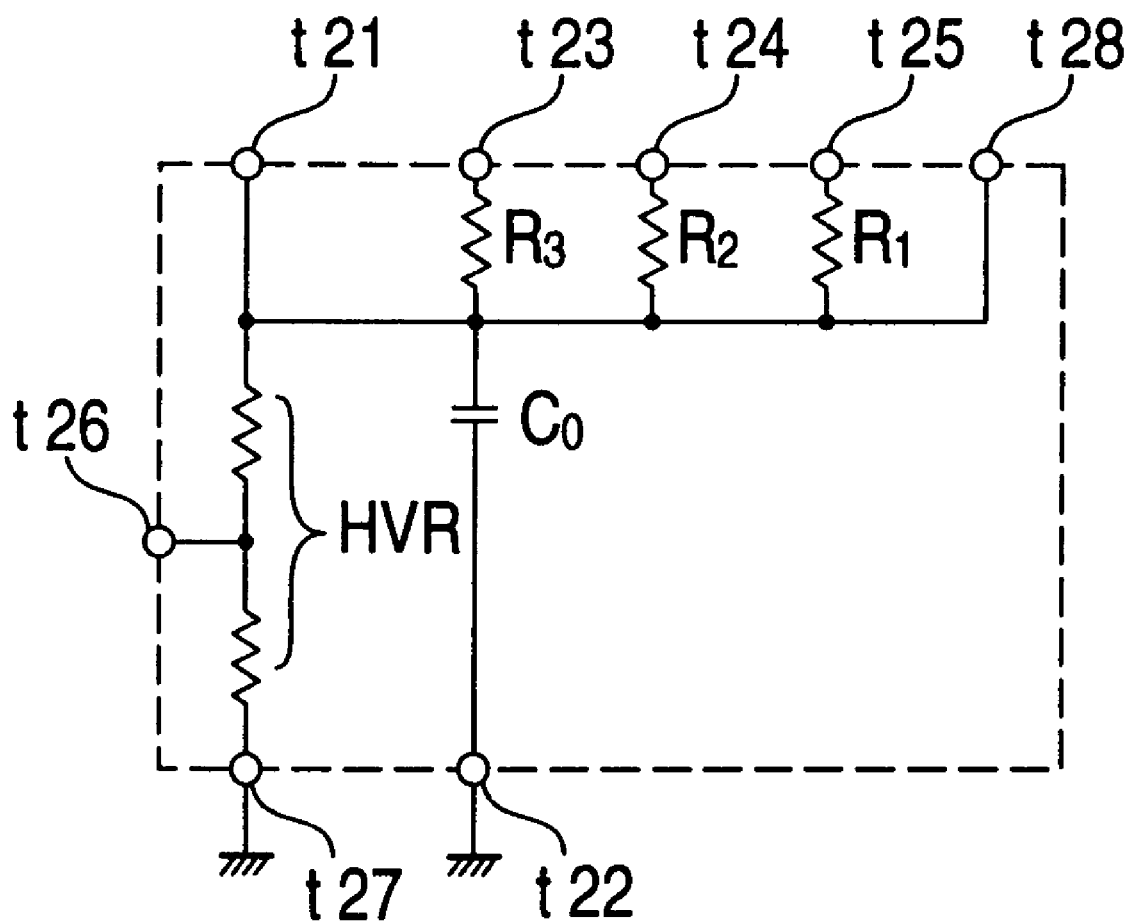
FIG. 10 shows a specific circuit configuration of a high-voltage distributor of the CRT display device according to the second embodiment.

FIG. 10 shows a specific circuit configuration of the high-voltage distributor 20 of the CRT display device of the second embodiment. In this embodiment, as in the case of FIG. 6, high-voltage pulses are supplied from the high-voltage generator 1 to a terminal t21 and the high-voltage distributor 20 supplies an anode voltage to the CRTs 3R, 3G, and 3B via the discharge current limiting resistors R1, R2, and R3 and the terminals t25, t24, and t23.

Although the above embodiments are directed to the CRT display devices to be used in a projector apparatus or the like, the invention is not limited to such a case and can also be applied to a CRT display device to be used in an ordinary television receiver or monitor apparatus.

What is claimed is:

1. A CRT display device comprising:
   high-voltage generating means for generating high-voltage pulses;
   high-voltage distributing means for converting the high-voltage pulses to a high voltage having a prescribed voltage value and for distributing the high voltage;
   a high-voltage supply line including a discharge current limiting resistor, wherein the high-voltage supply line extends from within the high-voltage distributing means to an anode; and
   a CRT supplied with the high voltage at the anode thereof via the high-voltage supply line.

2. The CRT display device according to claim 1, wherein the discharge current limiting resistor has a sufficiently larger resistance value than an inside carbon coating that is formed in the CRT.

3. The CRT display device according to claim 1, wherein the high-voltage distributing means distributes the high voltage to three CRTs that generate three primary color pictures, respectively.

4. The CRT display device of claim 3, wherein plural discharge limiting resistors are provided in respective parallel paths to the respective CRTs so as to limit discharge currents in the respective CRTs.

5. The CRT display device according to claim 1, wherein the discharge current limiting resistor is used as a current limiting resistor in the high-voltage distributing means.

6. The CRT display device according to claim 1, wherein the CRT display device comprises CRTs for R, G, and B and is used in a projector.

7. The CRT display device according to claim 1, wherein the CRT display device is used in a television receiver.

8. The CRT display device according to claim 1, wherein the CRT display device is used in a monitor apparatus.

9. A CRT display device comprising:
   a CRT including an anode;
   high-voltage generating means for generating high-voltage pulses;
   high-voltage distributing means for converting the high-voltage pulses to a high voltage, and for distributing the high voltage to the anode of the CRT; and
   a discharge current limiting resistor, disposed between the high-voltage distributing means atd the CRT's anode, that limits a discharge current in the CRT throughout a period during which an abnormal discharge occurs in the CRT.

10. The CRT display device according to claim 9, wherein the discharge current limiting resistor has a sufficiently larger resistance value than an inside carbon coating that is formed in the CRT.

11. The CRT display device according to claim 9, wherein the high-voltage distributing means distributes the high voltage to three CRTs that generate three primary color pictures, respectively.

12. The CRT display device of claim 11, wherein plural discharge limiting resistors are provided in respective parallel paths to the respective CRTs so as to limit discharge currents in the respective CRTs.

13. The CRT display device according to claim 9, wherein the discharge current limiting resistor is used as a current limiting resistor i n the high-voltage distributing means.

14. The CRT display device according to claim 9, wherein the CRT display device comprises CRTs for R, G, and B and is used in a projector.

15. The CRT display device according to claim 9, wherein the CRT display device is used in a television receiver.

16. The CRT display device according to claim 9, wherein the CRT display device is used in a monitor apparatus.

\* \* \* \* \*

UNITED STATES PATENT AND TRADEMARK OFFICE
CERTIFICATE OF CORRECTION

PATENT NO.   : 6,310,448 B1
DATED        : October 30, 2001
INVENTOR(S)  : Satoshi Oosuga et al.

It is certified that error appears in the above-identified patent and that said Letters Patent is hereby corrected as shown below:

<u>Column 7,</u>
Line 3, change "not described" to -- not be described --.
Line 21, change "not described" to -- not be described --.

<u>Column 8,</u>
Line 67, change "atd" to -- and --.

Signed and Sealed this

Thirtieth Day of April, 2002

JAMES E. ROGAN
*Director of the United States Patent and Trademark Office*